US011222625B2

(12) United States Patent
Sampath et al.

(10) Patent No.: US 11,222,625 B2
(45) Date of Patent: Jan. 11, 2022

(54) SYSTEMS AND METHODS FOR TRAINING DEVICES TO RECOGNIZE SOUND PATTERNS

(71) Applicant: Ademco Inc., Golden Valley, MN (US)

(72) Inventors: Pradyumna Sampath, Bangalore (IN); Ramprasad Yelchuru, Bangalore (IN); Purnaprajna R. Mangsuli, Bangalore (IN)

(73) Assignee: Ademco Inc., Golden Valley, MN (US)

( * ) Notice: Subject to any disclaimer, the term of this patent is extended or adjusted under 35 U.S.C. 154(b) by 123 days.

(21) Appl. No.: 16/384,397

(22) Filed: Apr. 15, 2019

(65) Prior Publication Data

US 2020/0327885 A1    Oct. 15, 2020

(51) Int. Cl.
*G10L 15/18* (2013.01)
*G06F 9/54* (2006.01)
*G06N 20/00* (2019.01)

(52) U.S. Cl.
CPC .............. *G10L 15/18* (2013.01); *G06F 9/542* (2013.01); *G06N 20/00* (2019.01)

(58) Field of Classification Search
None
See application file for complete search history.

(56) References Cited

U.S. PATENT DOCUMENTS

| 6,009,392 A | 12/1999 | Kanevsky et al. |
| 9,946,511 B2 | 4/2018 | Gelfenbeyn et al. |
| 2005/0071159 A1* | 3/2005 | Boman ............... G10L 21/0208 704/233 |
| 2007/0078649 A1* | 4/2007 | Hetherington ...... G10L 21/0216 704/226 |
| 2008/0159560 A1* | 7/2008 | Song ....................... G10L 25/78 381/94.1 |
| 2011/0289224 A1* | 11/2011 | Trott ...................... H04L 67/14 709/227 |
| 2015/0112678 A1* | 4/2015 | Binks ................. G10L 21/0216 704/236 |

(Continued)

OTHER PUBLICATIONS

Benjamin Elizalde et al., An Approach for Self-Training Audio Event Detectors Using Web Data, Jun. 27, 2017.

(Continued)

*Primary Examiner* — Michael N Opsasnick
(74) *Attorney, Agent, or Firm* — Fredrikson & Byron, P.A.

(57) ABSTRACT

Systems and methods for training a control panel to recognize user defined and preprogrammed sound patterns are provided. Such systems and methods can include the control panel operating in a learning mode, receiving initial ambient audio from a region, and saving the initial ambient audio as an audio pattern in a memory device of the control panel. Such systems and methods can also include the control panel operating in an active mode, receiving subsequent ambient audio from the region, using an audio classification model to make an initial determination as to whether the subsequent ambient audio matches or is otherwise consistent with the audio pattern, determining whether the initial determination is correct, and when the control panel determines that the initial determination is incorrect, modifying or updating the audio classification model for improving the accuracy in detecting future consistency with the audio pattern.

14 Claims, 2 Drawing Sheets

(56) References Cited

U.S. PATENT DOCUMENTS

| | | | | |
|---|---|---|---|---|
| 2015/0271654 A1* | 9/2015 | Johnson | ............. | H04W 4/14 |
| | | | | 455/456.3 |
| 2016/0036958 A1* | 2/2016 | Logan | ............. | G05B 15/02 |
| | | | | 455/414.1 |
| 2016/0158648 A1* | 6/2016 | Adamson | ............. | A63F 13/63 |
| | | | | 463/31 |
| 2018/0231653 A1* | 8/2018 | Pradeep | ............. | G06F 1/3231 |
| 2018/0233139 A1* | 8/2018 | Finkelstein | ............. | G06F 1/3206 |
| 2018/0239377 A1* | 8/2018 | Ovadia | ............. | G05D 23/1917 |

OTHER PUBLICATIONS

Narayan, How to teach Neural Networks to detect everyday sounds, https://www.skcript.com/svr/building-audio-classifier-nueral-network/, Mar. 16, 2018.

IBM Cloud Docs / Speech to Text, Creating a custom acoustic model, https://console.bluemix.net/docs/services/speech-to-text/acoustic-create.html#acoustic, Last updated: Jan. 29, 2019.

Sound classification—Classify the source of sound in an audio file—Custom sound classification model, Feb. 4, 2019.

* cited by examiner

SYSTEMS AND METHODS FOR TRAINING DEVICES TO RECOGNIZE SOUND PATTERNS

FIELD

The present invention relates generally to security systems and home automation systems. More particularly, the present invention relates to systems and methods for training devices in a security system or a home automation system to recognize preprogrammed or user customized sound patterns.

BACKGROUND

Known security systems and home automation systems can recognize ambient sound patterns that match preprogrammed sound patterns identified during manufacture or installation of devices in the security systems or the home automation systems. However, such known security systems and home automation systems cannot be trained to recognize user customized sound patterns that differ from the preprogrammed sound patterns. Additionally, the accuracy of audio classification models programmed during the manufacture or the installation of known security systems and home automation systems can be inaccurate because such known systems do not account for the variability of noise characteristics of deployed environments.

In view of the above, there is a need and an opportunity for improved systems and methods.

DETAILED DESCRIPTION

Figure 1:
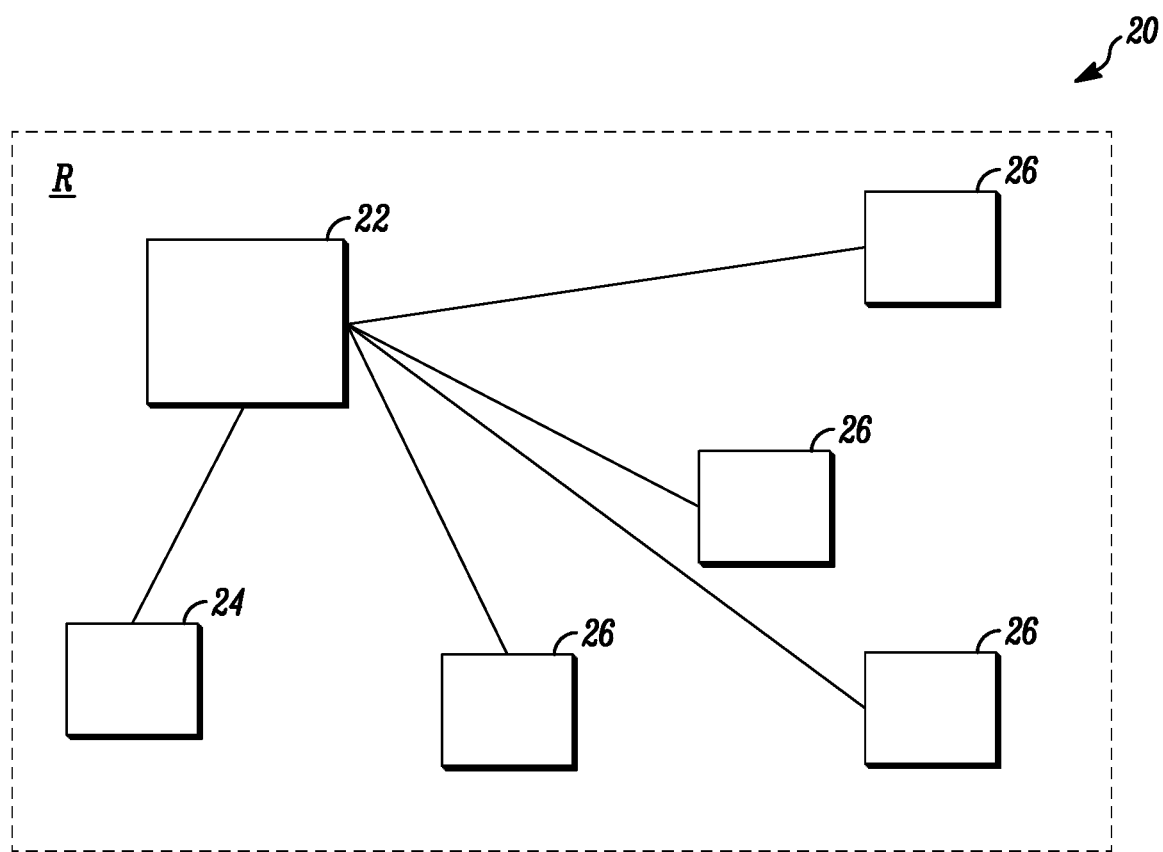
FIG. 1 is a block diagram of a system in accordance with disclosed embodiments.

While this invention is susceptible of an embodiment in many different forms, specific embodiments thereof will be described herein in detail with the understanding that the present disclosure is to be considered as an exemplification of the principles of the invention. It is not intended to limit the invention to the specific illustrated embodiments.

Embodiments disclosed herein can include systems and methods for training devices in a security system or a home automation system to recognize sound patterns. For example, such security systems or home automation systems can include a control panel or other similar device that can operate in a learning mode, during which the control panel can learn the sound patterns, and in an active mode, during which the control panel can identify the sound patterns and be trained for identifying the sound patterns at future times.

When the control panel is operating in the learning mode, the control panel can receive initial ambient audio from a region in which the devices in the security system or the home automation system are deployed. Then, the control panel can save the initial ambient audio as an audio pattern in a memory device of the control panel. In some embodiments, the initial ambient audio can include customized audio relevant to a user of the security system or the home automation system that is different than preprogrammed or preconfigured audio saved in the memory device during manufacture or installation of the control panel. For example, in some embodiments, the initial ambient audio can include live audio of the user's dog barking or the user's baby crying. Additionally, or alternatively, in some embodiments, the initial ambient audio can include, but is not limited to audio of a drill being used, a siren wailing, a phone ringing, a vacuum running, the user coughing, a door being operated, water running, knocking on a door, a microwave running, an electric shaver running, teeth brushing, a blender running, a dishwasher running, a doorbell ringing, a toilet flushing, a hairdryer running, the user laughing, the user snoring, the user typing, the user hammering, a car honking, a vehicle running, a saw being used, a cat meowing, an alarm clock activating, and kitchen items being used.

In some embodiments, the control panel can receive user input with the initial ambient audio that describes the initial ambient audio. In these embodiments, the control panel can use such a description of the initial ambient audio to identify user actions or non-actions that are consistent with a presence of the initial ambient audio in the region and/or user actions or non-actions that are inconsistent with the presence of the initial ambient audio in the region. Additionally or alternatively, in some embodiments, the control panel can receive user input with the initial ambient audio that directly identifies the user actions or non-actions that are consistent with the presence of the initial ambient audio in the region and/or the user actions or non-actions that are inconsistent with the presence of the initial ambient audio in the region.

In any embodiment, after operating in the learning mode, the control panel can transition to the active mode, and when operating in the active mode, the control panel can receive subsequent ambient audio from the region. Then, the control panel can use an audio classification model (e.g. audio processing rules) to make an initial determination as to whether the subsequent ambient audio matches or is otherwise consistent with the audio pattern, such as whether the subsequent ambient audio matches or is otherwise consistent with the user's dog barking or the user's baby crying.

In some embodiments, after initially determining whether the subsequent ambient audio matches or is otherwise consistent with the audio pattern, the control panel can determine whether the initial determination is correct. For example, in some embodiments, the control panel can identify and evaluate implicit and/or explicit feedback to determine whether the initial determination is correct.

In some embodiments, when the control panel determines that the initial determination is correct, the control panel can initiate one or more actions, such as activating a camera for monitoring the region or activating an alarm in the region, or can transmit one or more signals to initiate the same. In some embodiments, a type of the one or more other actions initiated by the control panel can be dependent on a severity and a nature of a type of event associated with the audio pattern.

However, in some embodiments, when the control panel determines that the initial determination is incorrect, the control panel can modify or update the audio classification model for accuracy in detecting future consistency with the audio pattern. For example, when the control panel initially determines that the subsequent ambient audio matches or is otherwise consistent with the audio pattern, but subsequently determines that the initial determination is incorrect, that is, the initial determination was a false positive, the control panel can modify or update the audio classification model for the accuracy in detecting the future consistency with the audio pattern so that the audio classification model as modified or updated would identify the subsequent ambient audio as being inconsistent with the audio pattern. Similarly, in some embodiments, when the control panel initially determines that the subsequent ambient audio fails to match or is otherwise inconsistent with the audio pattern, but subsequently determines that the initial determination is incorrect, that is, the initial determination was a false negative, the control panel can modify or update the audio classification model for the accuracy in detecting the future consistency with the audio pattern so that the audio classification model as modified or updated would identify the subsequent ambient audio as being consistent with the audio pattern at future times.

In some embodiments, a format and a composition of the audio pattern can be dependent on a type of the audio classification model being used to make the initial determination as to whether the subsequent ambient audio matches or is otherwise consistent with the audio pattern. For example, in some embodiments, the audio classification model can include one or more type of a supervised machine learning model, such as a Gauss Naïve Bayes classifier, a support vector machine classifier, and a Fischer's linear discriminant analysis.

When the Gauss Naïve Bayes classifier type model is used to make the initial determination as to whether the subsequent ambient audio matches or is otherwise consistent with the audio pattern, the audio pattern can include a derived mean and variance of audio features of the initial ambient audio. For example, the audio features can include descriptive statistics of a window of audio data, a functional approximation of the window of audio data, or any characterization of the window of audio data, and in some embodiments, a size of the window of audio data can be dependent on a length of the initial ambient audio and can be, for example, 1 sec, 10 sec, or 1 min. During the active mode, a probability the audio features of the subsequent ambient audio belonging within a normal distribution of the derived mean and variance of the audio features of the initial ambient audio can be calculated. When the probability is larger than a preset threshold, for example, 75%, the subsequent ambient audio can be identified as matching or being otherwise consistent with the audio pattern.

However, when the support vector machine classifier type model is used to make the initial determination as to whether the subsequent ambient audio matches or is otherwise consistent with the audio pattern, the audio pattern can include a hyperplane/kernel that can differentiate the audio features of the initial ambient audio into a unique event as compared with the audio features of background noise and other custom or preconfigured events. During the active mode, the audio features of the subsequent ambient audio can be evaluated with the hyperplane/kernel in an attempt to assign the audio features of the subsequent ambient audio to the unique event. When the audio features of the subsequent ambient audio can be assigned to the unique event, the subsequent ambient audio can be identified as matching or being otherwise consistent with the audio pattern.

However, when the Fischer's linear discriminant analysis model is used to make the initial determination as to whether the subsequent ambient audio matches or is otherwise consistent with the audio pattern, the audio pattern can include a linear hyperplane that that can differentiate the audio features of the initial ambient audio into a unique event as compared with the audio features of background noise and other custom or preconfigured events. For example, the linear hyperplane can compresses clusters of the audio features of the initial ambient audio that correspond to the unique event and locate those clusters far apart from the clusters of the audio features of the background noise and other custom or preconfigured events to enable best possible discrimination among all events. During the active mode, the audio features of the subsequent ambient audio can be projected on to the liner hyperplane in an attempt to assign the audio features of the subsequent ambient audio to the unique event. When the audio features of the subsequent ambient audio can be assigned to the unique event, the subsequent ambient audio can be identified as matching or being otherwise consistent with the audio pattern.

As disclosed and described herein, the control panel can use the explicit feedback to determine whether the initial determination is correct. For example, in some embodiments, when the control panel initially determines that the subsequent ambient audio matches or is otherwise consistent with the audio pattern, the control panel can transmit a notification message indicative of the initial determination to a notification device.

Then, responsive to the notification message, the control panel can receive the explicit feedback from the user directly or via the notification device, and the explicit feedback can explicitly confirm or deny that the subsequent ambient audio matches or is otherwise consistent with the audio pattern. For example, the explicit feedback can include user input confirming or denying that the user's dog is barking or the user's baby is crying. In some embodiments, when the explicit feedback denies that the subsequent ambient audio matches or is otherwise consistent with the audio pattern, that is, identifies a false positive, the control panel can determine that the initial determination is incorrect and can modify or update the audio classification model as described herein.

Similarly, when the control panel initially determines that the subsequent ambient audio fails to match or is otherwise inconsistent with the audio pattern, but receives the explicit feedback denying that the subsequent ambient audio fails to match or is otherwise inconsistent with the audio pattern, that is, identifies a false negative, the control panel can determine that the initial determination is incorrect and can modify or update the audio classification model as described herein. In this regard, the control panel can receive the explicit feedback even without transmitting the notification message to the notification device.

As further disclosed and described herein, the control panel can use the implicit feedback to determine whether the initial determination is correct. For example, the implicit feedback can include detecting an occurrence or non-occurrence of one or more of the user actions or non-actions that would be expected when the user's dog is barking or the user's baby is crying, such as opening a door to or movement towards a room in which the dog or the baby is located.

In some embodiments, when the control panel initially determines that the subsequent ambient audio matches or is otherwise consistent with the audio pattern, but subsequently detects one or more of the user actions or non-actions that are inconsistent with the presence of the initial ambient audio in the region, that is, identifies a false positive, the control panel can determine that the initial determination is incorrect and can modify or update the audio classification model as described herein. Similarly, when the control panel initially determines that the subsequent ambient audio fails to match or is otherwise inconsistent with the audio pattern, but subsequently detects one or more of the user actions or non-actions that are consistent with the presence of the initial ambient audio in the region, that is, identifies a false negative, the control panel can determine that the initial determination is incorrect and can modify or update the audio classification model as described herein.

FIG. 1 is a block diagram of a system 20 in accordance with disclosed embodiments. As seen in FIG. 1, the system 20 can include a control panel 22, a notification device 24, and a plurality of connected devices 26, such as sensors, microphones, cameras, and the like, deployed in a region R. As further seen in FIG. 1, the notification device 24 and the plurality of connected devices 26 can communicate with the control panel 22 via known wired and/or wireless mediums.

Figure 2:
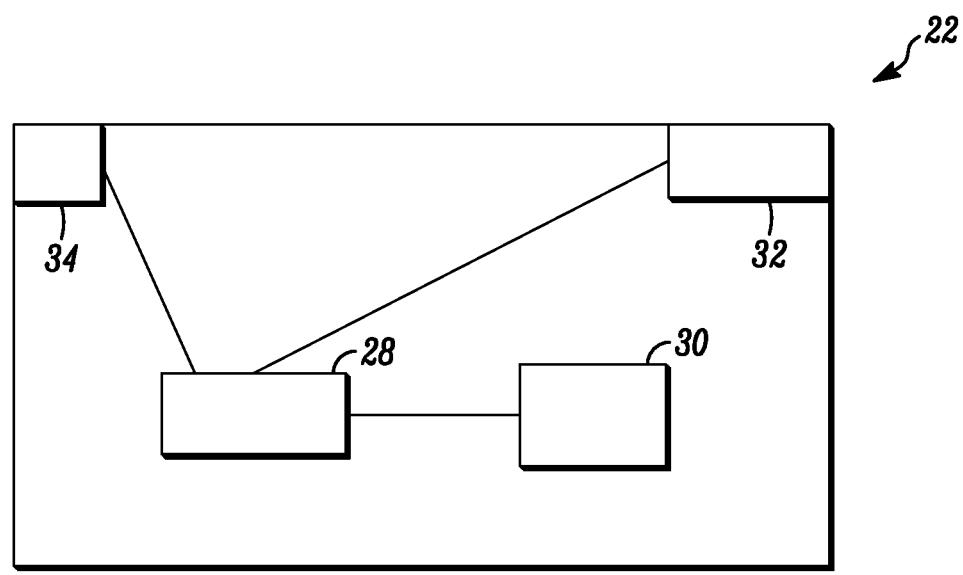
FIG. 2 is a block diagram of a control panel in accordance with disclosed embodiments.

FIG. 2 is a block diagram of the control panel 22 in accordance with disclosed embodiments. As seen in FIG. 2, the control panel 22 can include a programmable processor 28, a memory device 30, a microphone 32, and a communication interface 34.

Figure 3:
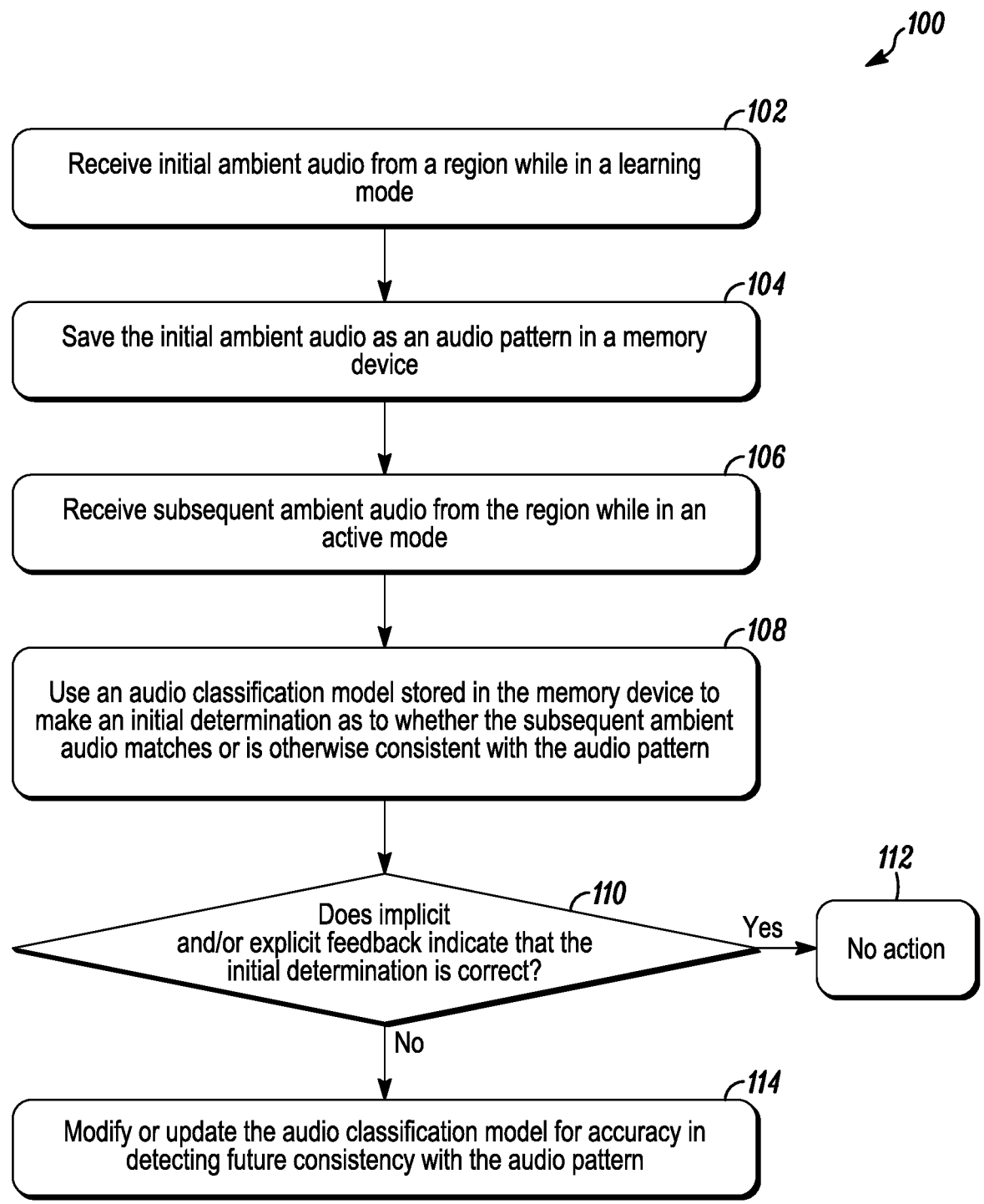
FIG. 3 is a flow diagram of a method in accordance with disclosed embodiments.

FIG. 3 is a flow diagram of a method 100 in accordance with disclosed embodiments. As seen in FIG. 3, the method 100 can include the programmable processor 28 receiving initial ambient audio from the region R via the microphone 32 while in a learning mode, as in 102, and saving the initial ambient audio as an audio pattern in the memory device 30, as in 104. Then, the method 100 can include the programmable processor 28 transitioning to an active mode and receiving subsequent ambient audio from the region R via the microphone 32 while in the active mode, as in 106.

Responsive to receiving the subsequent ambient audio as in 106, the method 100 can include the programmable processor 28 using audio classification model stored in the memory device 30 to make an initial determination as to whether the subsequent ambient audio matches or is otherwise consistent with the audio pattern, as in 108, identifying implicit and/or explicit feedback, and determining whether the implicit and/or explicit feedback indicates whether the initial determination made as in 108 is correct, as in 110. In some embodiments, the programmable processor 28 can receive the explicit feedback from the communication interface 34, and the communication interface 34 can receive the explicit feedback directly from a user or from the notification device 24 receiving the explicit feedback directly from the user. Additionally or alternatively, in some embodiments, the programmable processor 28 can receive the implicit feedback from the communication interface 34, and the communication interface 34 can receive the implicit feedback from one or more of the plurality of connected devices 26. For example, the implicit feedback can include information about the region R or activity therein detected by the one or more of the plurality of connected devices 26.

When the programmable processor 28 determines that initial determination made as in 108 is correct as in 110, the method 100 can include the programmable processor 28 taking no action, as in 112. However, when the programmable processor 28 determines that the initial determination made as in 108 is incorrect as in 110, the method 100 can include the programmable processor 28 modifying or updating the audio classification model for accuracy in detecting future consistency with the audio pattern, as in 114.

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A method comprising:
a control panel operating in a learning mode receiving initial ambient audio from a region;
the control panel receiving user input that includes a description of the initial ambient audio;
the control panel saving the initial ambient audio as an audio pattern and the description of the initial ambient audio in a memory device of the control panel;
the control panel operating in an active mode receiving subsequent ambient audio from the region;
the control panel using audio classification model to make an initial determination as to whether the subsequent ambient audio matches or is otherwise consistent with the audio pattern;
the control panel using the description of the initial ambient audio to identify a user action or non-action in the region, the user action or non-action in the region comprising at least one of a first user action or non-action and second user action or non-action;
the control panel identifying the first user action or non-action as consistent with a presence of the initial ambient audio in the region and the control panel identifying the second user action or non-action as inconsistent with the presence of the initial ambient audio in the region;
when the control panel initially determines that the subsequent ambient audio matches or is otherwise consistent with the audio pattern but detects the second user action or non-action, the control panel determining that the initial determination is incorrect;
when the control panel initially determines that the subsequent ambient audio fails to match or is otherwise inconsistent with the audio pattern but detects the first user action or non-action, the control panel determining that the initial determination is incorrect; and
when the control panel determines that the initial determination is incorrect, the control panel modifying or updating the audio classification model for accuracy in detecting future consistency with the audio pattern.

2. The method of claim 1 further comprising:
when the control panel initially determines that the subsequent ambient audio matches or is otherwise consistent with the audio pattern, the control panel transmitting a notification message to a notification device; and
responsive to the notification message, the control panel receiving user input confirming or denying the subsequent ambient audio matching or otherwise being consistent with the audio pattern.

3. The method of claim 2 further comprising:
when the user input denies that the subsequent ambient audio matches or is otherwise consistent with the audio pattern, the control panel determining that the initial determination is incorrect.

4. The method of claim 1 further comprising:
when the control panel initially determines that the subsequent ambient audio fails to match or is otherwise inconsistent with the audio pattern, but receives user input indicating that the subsequent ambient audio matches or is otherwise consistent with the audio pattern, the control panel determining that the initial determination is incorrect.

5. The method of claim 1 wherein the initial ambient audio is different from preprogrammed audio saved in the memory device during manufacture of the control panel.

6. The method of claim 1 further comprising:
when the control panel initially determines that the subsequent ambient audio matches or is otherwise consistent with the audio pattern, but that the initial determination is incorrect, the control panel modifying or updating the audio classification model for the accuracy in detecting the future consistency with the audio pattern so that the audio classification model as modified or updated would identify the subsequent ambient audio as failing to match or otherwise being inconsistent with the audio pattern.

7. The method of claim 1 further comprising:
when the control panel initially determines that the subsequent ambient audio fails to match or is otherwise inconsistent with the audio pattern, but that the initial determination is incorrect, the control panel modifying or updating the audio classification model for the accuracy in detecting the future consistency with the audio pattern so that the audio classification model as modified or updated would identify the subsequent ambient audio as matching or otherwise being consistent with the audio pattern.

8. A system comprising:
a programmable processor;
a memory device coupled to the programmable processor; and
a microphone coupled to the programmable processor,
wherein, when operating in a learning mode, the programmable processor receives initial ambient audio from a region via the microphone, ii) receives user input that includes a description of the initial ambient audio, and iii) saves the initial ambient audio as an audio pattern and the description of the initial ambient audio in the memory device,
wherein, when operating in an active mode, the programmable processor receives subsequent ambient audio from the region via the microphone and uses audio classification model stored in the memory device to make an initial determination as to whether the subsequent ambient audio matches or is otherwise consistent with the audio pattern,
wherein, when operating in the active mode, the programmable processor uses the description of the initial ambient audio to identify a user action or non-action in the region, the user action or non-action in the region comprising at least one of first user action or non-action and second user action or non-action,
wherein the programmable processor identifies the first user action or non-action as consistent with a presence of the initial ambient audio in the region and the programmable processor identifies the second user action or non-action as inconsistent with the presence of the initial ambient audio in the region,
wherein when the programmable processor initially determines that the subsequent ambient audio matches or is otherwise consistent with the audio pattern but detects the second user action or non-action, the programmable processor determines that the initial determination is incorrect;
when the programmable processor initially determines that the subsequent ambient audio fails to match or is otherwise inconsistent with the audio pattern but detects the first user action or non-action, the programmable processor determines that the initial determination is incorrect; and
wherein, when the programmable processor determines that the initial determination is incorrect, the programmable processor modifies or updates the audio classification model for accuracy in detecting future consistency with the audio pattern.

9. The system of claim 8 wherein, when the programmable processor initially determines that the subsequent ambient audio matches or is otherwise consistent with the audio pattern, the programmable processor transmits a notification message to a notification device, and wherein, responsive to the notification message, the programmable processor receives user input confirming or denying the subsequent ambient audio matching or otherwise being consistent with the audio pattern.

10. The system of claim 9 wherein, when the user input denies that the subsequent ambient audio matches or is otherwise consistent with the audio pattern, the programmable processor determines that the initial determination is incorrect.

11. The system of claim 8 wherein, when the programmable processor initially determines that the subsequent ambient audio fails to match or is otherwise inconsistent with the audio pattern, but receives user input indicating that the subsequent ambient audio matches or is otherwise consistent with the audio pattern, the programmable processor determines that the initial determination is incorrect.

12. The system of claim 8 wherein the initial ambient audio is different from preprogrammed audio saved in the memory device during manufacture.

13. The system of claim 8 wherein, when the programmable processor initially determines that the subsequent ambient audio matches or is otherwise consistent with the audio pattern, but that the initial determination is incorrect, the programmable processor modifies or updates the audio classification model for the accuracy in detecting the future consistency with the audio pattern so that the audio classification model as modified or updated would identify the subsequent ambient audio as failing to match or otherwise being inconsistent with the audio pattern.

14. The system of claim 8 wherein, when the programmable processor initially determines that the subsequent ambient audio fails to match or is otherwise inconsistent with the audio pattern, but that the initial determination is incorrect, the programmable processor modifies or updates the audio classification model for the accuracy in detecting the future consistency with the audio pattern so that the audio classification model as modified or updated would identify the subsequent ambient audio as matching or otherwise being consistent with the audio pattern.

* * * * *